Jan. 17, 1961 W. C. HANSEN 2,968,504
RETAINING SPRING FASTENER
Filed April 3, 1957

INVENTOR.
WRAY C HANSEN
BY
Philip H. Sheridan
ATTORNEY

United States Patent Office 2,968,504
Patented Jan. 17, 1961

2,968,504

RETAINING SPRING FASTENER

Wray C. Hansen, 5810 W. 38th Ave., Denver, Colo.

Filed Apr. 3, 1957, Ser. No. 650,362

8 Claims. (Cl. 287—53)

This invention relates to a retaining spring particularly designed for use in connection with attachment of operating knobs or handles to shafts. From a broader aspect the retaining spring may be employed as a fastener for securing two parts together, such as where the parts are assembled by sliding one part within the other and the fastener is used to prevent relative axial movement and relative rotary movement between the parts.

Fasteners or retaining springs of this general type are common, such as the types shown in the Lindstrom Patent No. 2,080,361 and the Hansen Patent No. 2,718,417. However, to the best of my knowledge such prior retaining springs are not completely advantageous for several reasons, some of which are that they are not completely symmetrical from a functional standpoint, they do not provide a close and predetermined fit, they do not provide a means for gradually increasing during assembly the frictional effect on the shaft whereby assembly of the parts is facilitated, the tensional effect to maintain the parts against relative axial and rotative movement is relatively weak and they require one end of the spring to be inserted within the knob socket first.

It is an object of this invention to provide a retaining spring which functions as a fastener for connecting a knob or the like to a shaft which overcomes the defects above mentioned of prior art springs and wherein the spring is preferably positioned within an opening of the knob and one end of the shaft is positioned within the spring.

It is another object of this invention to provide a retaining spring of the type described having the shape of a hollow, completely symmetrical body from a functional standpoint and which provides a close and predetermined fit between the spring and the knob and shaft.

Also it is an object of this invention to provide a retaining spring which may be readily positioned within the opening or shaft receiving slot of a knob and which is provided with friction means for retaining the shaft positioned within the spring, such friction means being gradually increased as the shaft enters the otherwise unobstructed passage of the spring body.

An object is to provide a spring as described in the preceding paragraph wherein the said friction means is located substantially inwardly of the ends of the spring body.

A further object is to provide an improved retaining spring which may be properly positioned between a shaft and a knob to function as a fastener therefor and which is constructed so that it may be easily assembled to fasten the parts together.

Yet another object is to provide a spring of the type described which may be readily indexed within the knob socket and which is constructed so that it is immaterial which end thereof is inserted first.

Other objects and advantages of the invention will be apparent upon considering the following detailed description in conjunction with the drawings wherein the parts are shown approximately four times their normal size and wherein.

Figure 1:
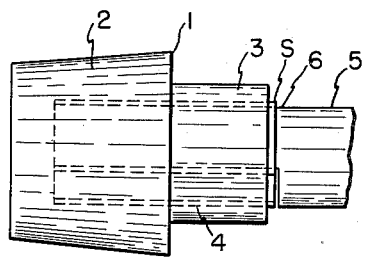
Figure 1 is a side elevational view of a knob applied to a shaft with one form of spring retainer of this invention.
Figure 2:
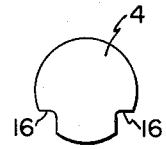
Figure 2 is a view illustrating the opening or socket of the knob of Figure 1.

Referring to Figures 1 and 2, there is shown a knob generally represented by the numeral 1 having an enlarged handle portion 2 and a reduced portion 3 with an opening or socket 4 extending therein as shown. A shaft 5 having a D-shaped end portion 6 is to be fastened to the knob 1 and the retaining springs of this invention generally represented by S and S' are for this purpose. Figure 1 illustrates spring S as positioned within socket 4 but spring S' may be similarly positioned, the only difference being in the relative size of the parts as spring S' is particularly designed for a smaller assembly. It is to be understood that the parts to be connected, namely shaft 5 and knob 1, may take many other forms although a shaft having a D-shaped end portion 6 is quite common. The retaining springs S and S' constitute the essence of this invention and these springs are preferably die formed from a single piece of spring steel, although any suitable metal having resilient characteristics such as beryllium, copper or spring brass may be employed. The springs S and S' each functions as a bushing for securing a knob 1 to a shaft 5 (this being illustrated with spring S in Figure 1) whereby the knob and shaft are prevented from relative axial and rotative movements.

Figure 3:
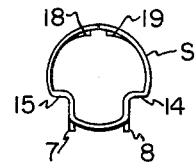
Figure 3 is an end view of the spring shown in Figure 1 as it would appear after being inserted in the opening of the knob.
Figure 4:
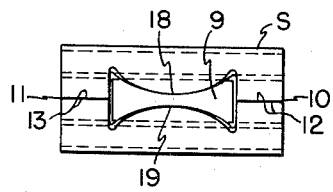
Figure 4 is a top view of the retaining spring.

As shown, the spring S is in the form of a hollow symmetrical body shaped to envelop the shaft and it is provided with spaced, externally projecting means in the form of parallel tabs or tongues 7 and 8 for anchoring and holding the spring within the knob 1 and preventing relative rotation therebetween. Considering the opening 4 of the knob and bearing in mind that the cylindrical dimension of the exterior of the spring body, as shown in Figure 3, is such that when inserted within socket 4 it will have slight skin friction engagement with the wall thereof, it is apparent that the tongues or tabs 7 and 8, assuming the knob 1 is of wood or plastic-like material, will dig into the fibers of the material and this action anchors the spring within the knob and prevents radial movement of the spring therein. It is to be noted that the top of the spring S, as will be more fully explained, is provided with a cut-away area 9 which is substantially diametrically opposite tabs 7 and 8 and in addition the spring S is further longitudinally slit or split at its top as shown at 10 and 11 forming end portions 12 and 13 which are part of the complete spring envelope.

Figure 5:
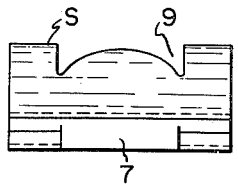
Figure 5 is a side elevational view thereof.
Figure 6:
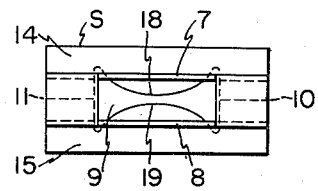
Figure 6 is a bottom view thereof.

As clearly shown in Figures 3 and 5, the spring S is provided with a pair of parallel longitudinal depressions 14 and 15 which are adapted to seat on the shoulders 16 of the opening 4 and index and locate the spring within socket 4. These depressions 14 and 15 provide flanges for engaging the flattened surface of the D-shaped extension 6 of shaft 2 and, as is apparent, will prevent rotation of the shaft extension 6 when the latter is positioned within the spring. The shoulders 16 which receive the depressions 14 and 15 likewise prevent relative rotation of the parts.

Means must be provided for frictionally retaining the shaft extension 6 within the spring S and in this connection reference is made to the cut-away area 9 which forms the arcuate leaves or ends 18 and 19. When the spring is positioned within the opening 4 the leaves 18 and 19 are substantially located as shown in Figure 3 and assuming the shaft extension 6 has a dimension substantially equal to the interior dimension of the spring cylinder, then as the shaft first enters the spring S it will have a predetermined skin frictional fit therewith and thereafter force the leaves 18 and 19 outwardly. In turn the leaves, which are normally positioned inwardly and have their tips facing each other, will be forced outwardly and put under tension and will apply the necessary final friction on the cylindrical portion of shaft extension 6 to maintain the shaft in position. It is important to note that the strong frictional effect of the leaves on the shaft will gradually build up as the shaft strikes the leaves 18 and 19 and this is so due to the contour of these leaves. It is also important to note that the shaft, when it first enters the spring S, has no real force to overcome and does not meet such, due to the spring passage being otherwise unobstructed, until it reaches the leaves 18 and 19 and thus it should be apparent that this will facilitate greatly the assembly of the three parts.

Emphasizing, it should be observed that the spring S is symmetrical and in view of this, the location of tabs 7 and 8, the contour and location of leaves 18 and 19, the spring S may be positioned within the opening 4 with either end thereof first entering the slot 4. As to preventing relative rotation of the spring S within the knob, the tabs 7 and 8 of substantial size and the depressions 14 and 15 cooperating with shoulders 16 both provide this, and of course the entire opening envelope is designed to provide a predetermined frictional fit with the wall of socket 4. This spring also provides a predetermined fit with the shaft, the skin friction first taking place and then the strong leaf friction taking over. In many prior art fasteners, strong friction is applied to the shaft as soon as it enters the fastener thus necessitating, in order to facilitate assembly, beveling of the entrance face of the spring. Such is not necessary with the spring S or as will be apparent with spring S', due to the real friction on the shaft not being applied until the shaft strikes the leaves 18 and 19, at which time it is positioned quite a distance within the spring confines. The maximum frictional effect would be applied, following a gradual build-up, when the shaft reaches the point where the leaves come closest together which is at the center of their arcs. It should also be noted that the contour and size of the leaves 18 and 19 is designed to provide good spring action and furthermore that it is immaterial, as far as the function of the leaves, which end is inserted within the bore 4 first.

Figure 7:
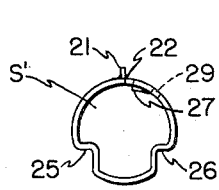
Figure 7 is an end view of another form of retaining spring of this invention as it would appear following insertion.
Figure 8:
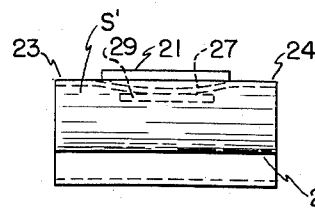
Figure 8 is a side elevational view of the spring of Figure 7 taken from the left side of Figure 7.
Figure 9:
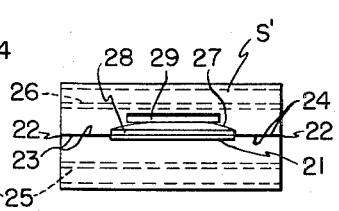
Figure 9 is a top view of the spring of Figure 7.

Now, considering the retaining spring S' of Figures 7, 8 and 9, this being perhaps the preferred embodiment of the invention, it will be apparent that this spring is designed for use in much the same manner as illustrated in Figure 1 with spring S. However, it has been found that spring S' is more feasible and practical where smaller dimensions require smaller retaining springs, and thus in describing this spring let it be assumed that spring S' is to be substituted for spring S in Figure 1 with all of the parts of smaller dimension. Of course, actually all showings on the drawings are enlarged with respect to actual size.

Spring S' is also in the form of a hollow substantially symmetrical body shaped to envelop the shaft and is provided at the top side thereof with externally projecting means in the form of a tab or tongue 21 for anchoring the spring S' within a knob and preventing relative rotation thereof. The envelope of spring S' is likewise sized to function similar to spring S within, for example, a socket 4 and, of course, the tab 21 would dig into the fibers of the knob material to hold the spring therein. It will be noted that the spring S' is longitudinally split at 22 between the ends of the spring and further the tab 21 is struck up immediately adjacent the longitudinal splits from a cut-out or stamped-out area 28, the splits 22 forming end portions 23 and 24 and the tab being positioned between a portion 23 and 24.

The spring S' is likewise provided with a pair of parallel longitudinal depressions 25 and 26 which are adapted to seat on the shoulders 16 of the opening 4 to index and locate the spring in socket 4. These depressions of course provide flanges which are engaged by the flattened surface of a D-shaped shaft and, of course, the shoulders 16, and in turn the depressions 25 and 26 prevent relative rotation of the fastened parts.

To provide for frictionally retaining a D-shaped shaft extension 6 within the spring S', there is formed the depressed arcuate leaf 27, this leaf being formed on the right side of slits 22, as viewed in Figure 9, and between the portions 23 and 24 on this same side. In order to properly form the leaf 27, it has been found highly desirable to stamp out or otherwise provide (in the body of spring S') at least one relieved slot area 29 adjacent the bottom end of the leaf 27. Assuming spring S' is positioned within opening 4, and of course the spring S' is designed to provide a predetermined frictional fit with the socket wall, the depressed leaf 27 is located about as shown in Figures 7, 8 and 9. The shaft extension 6 now enters spring S', and it will force the leaf 27 upwardly or outwardly with respect to the center of said spring. Thus, the leaf 27 will be put under tension and will apply the necessary friction on the cylinder portion of shaft extension 6 to properly maintain the shaft in position. Here again it is important to note that the real frictional effect on the shaft 6 would gradually build up as the shaft strikes the leaf 27 and this is so due to the contour of the leaf.

It is also important to note that the shaft, when it first enters the spring S' has no real force to overcome (only the slight skin frictional effect between the envelope-socket wall) until it reaches the leaf 27, and of course the spring S' may be utilized with either end thereof being the one that is first positioned in the knob opening.

The characteristics and advantages of spring S' are much similar to those described in connection with spring S and this should be readily apparent, the only difference being that spring S' would be used in connection with smaller parts, or in other words, the single tab 21 and single leaf 27 do the job that requires two leaves and two tabs in spring S. To repeat, spring S' is symmetrical and, in view thereof and the location of tab 21 and leaf 27 as well as the contour of the latter, spring S' may be positioned within an opening with either end thereof first entering the opening. The tab 21 and the depressions 25 and 26 cooperate to locate, index and prevent relative rotation of the spring S' within the knob. The maximum frictional effect upon the shaft would be applied (as the shaft enters the unobstructed passage of the spring S' and following a gradual build-up) when the shaft reaches the center of the arc of leaf 27. The spring S' likewise provides a close and predetermined fit between the spring and shaft and the spring and knob and the arc contour of leaf 27 is designed to provide good spring action, and as far as the leaf 27 is concerned it is likewise immaterial which end of spring S' is inserted within the bore first.

At this time it should be mentioned that both springs S and S' may be utilized in connection with various types of knob cavities, that of Figure 2, being by no means limiting. The knob material having a bore 4 therein would necessarily be of soft substance so that the tabs could bite, but the knob could be made of hard material with the opening including a slot for receiving the one or more tabs, or as a matter of fact, the tabs could be eliminated due to the skin frictional fit between the springs and socket walls. Also, the bore 4 could be made of soft material and completely circular whereby the tab or tabs of the springs would be the indexing and locating means. It should also be noted in connection with both springs S and S' that the tabs 7 and 8 and 21 are spaced an equal distance from each spring end and this permits either end to be easily inserted in the bore first and insures that part of the spring will be within the bore before any digging or biting of the tabs takes place.

As many alterations may be made of the invention without departing from the scope thereof, it is to be understood that all matters herein set forth or shown in the drawing is to be interpreted as illustrative and not in a limiting sense.

What is claimed is:

1. A resilient spring for securing an operating knob or the like to a shaft comprising a hollow substantially symmetrical body of substantial tubular configuration and of spring metal, said body being adapted to be inserted in a socket of the knob and being formed with means for retaining the body within the socket, and means for frictionally attaching the body to the shaft received therewithin comprising at least one leaf forming inwardly projecting means in said body, said leaf being located intermediate the ends of the body and being curved to extend downwardly within the body to engage and provide a varying frictional effect to the shaft as the latter enters the socket, the furthest downwardly extending portion of the leaf being substantially located in a plane transverse to the longitudinal axis of the body at the midway point of the axis.

2. A spring as defined in claim 1 for receiving a D-shaped end of the shaft wherein the body is formed with a pair of inwardly extending coplanar flanges forming seats for the flat surface of the shaft end and the leaf is spaced from the plane of said flanges for engaging the cylindrical part of the shaft end.

3. A spring as defined in claim 1 wherein the body is longitudinally split and the leaf is in the form of a depression positioned on one side of the split.

4. A spring as defined in claim 1 wherein there is provided a cut-away area forming two cooperating resilient leaves, said leaves being arcuate shaped with the extending portion of each leaf facing each other, said extending portions being spaced from each other an amount gradually increasing from either side of the centers of their arcs whereby the leaves cooperate to provide friction on the shaft which is gradually increased as the shaft enters the otherwise unobstructed passage of the body.

5. A spring as defined in claim 4 wherein the retaining means comprises two spaced and parallel tabs extending externally from the body intermediate the ends thereof and substantially diametrically opposite the cut-away area.

6. A spring as defined in claim 3 wherein the leaf is arcuate shaped to provide friction on the shaft which is gradually increased as the shaft enters the otherwise unobstructed passage of the body.

7. A spring as defined in claim 6 wherein the retaining means comprises a tab extending externally from the body intermediate the ends thereof and immediately adjacent the split but on the side thereof opposite where said leaf is positioned.

8. A spring as defined in claim 6 wherein there is provided at least one slot through the body immediately adjacent the leaf on the side thereof opposite the split.

References Cited in the file of this patent

UNITED STATES PATENTS

| | | |
|---|---|---|
| 2,080,361 | Lindstrom | May 11, 1937 |
| 2,745,689 | Balint et al. | May 15, 1956 |